United States Patent
Krueger et al.

(10) Patent No.: US 11,008,477 B2
(45) Date of Patent: May 18, 2021

(54) INTAGLIO MAGNETIC MACHINE READABLE OXIDATIVE DRYING INKS

(71) Applicant: SICPA HOLDING SA, Prilly (CH)

(72) Inventors: Jessica Krueger, Les Paccots (CH); Cécile Pasquier, Marly (CH); Patrick Magnin, Evian-les-Bains (FR)

(73) Assignee: SICPA HOLDING SA, Prilly (CH)

( * ) Notice: Subject to any disclaimer, the term of this patent is extended or adjusted under 35 U.S.C. 154(b) by 381 days.

(21) Appl. No.: 16/074,028

(22) PCT Filed: Jan. 26, 2017

(86) PCT No.: PCT/EP2017/051624
§ 371 (c)(1),
(2) Date: Jul. 30, 2018

(87) PCT Pub. No.: WO2017/129666
PCT Pub. Date: Aug. 3, 2017

(65) Prior Publication Data
US 2019/0040271 A1 Feb. 7, 2019

(30) Foreign Application Priority Data
Jan. 29, 2016 (EP) .................................... 16153347

(51) Int. Cl.
| | | |
|---|---|---|
| *C09D 11/037* | (2014.01) | |
| *B41M 3/14* | (2006.01) | |
| *B41M 1/10* | (2006.01) | |
| *C09D 11/03* | (2014.01) | |
| *C08K 5/3475* | (2006.01) | |
| *C08K 9/10* | (2006.01) | |
| *C09D 11/10* | (2014.01) | |

(52) U.S. Cl.
CPC ............. *C09D 11/037* (2013.01); *B41M 1/10* (2013.01); *B41M 3/14* (2013.01); *C09D 11/03* (2013.01); *C08K 5/3475* (2013.01); *C08K 9/10* (2013.01); *C09D 11/10* (2013.01)

(58) Field of Classification Search
None
See application file for complete search history.

(56) References Cited

U.S. PATENT DOCUMENTS

| | | | |
|---|---|---|---|
| 3,599,153 A | 8/1971 | Lewis et al. | |
| 3,618,765 A | 11/1971 | Cooper et al. | |
| 4,705,300 A | 11/1987 | Berning et al. | |
| 4,705,356 A | 11/1987 | Berning et al. | |
| 4,721,271 A | 1/1988 | Goldstein et al. | |
| 5,074,914 A | 12/1991 | Shirota et al. | |
| 5,084,351 A | 1/1992 | Philips et al. | |
| 5,211,877 A | 5/1993 | Andrejewski et al. | |
| 5,214,530 A | 5/1993 | Coombs et al. | |
| 5,281,480 A | 1/1994 | Phillips et al. | |
| 5,362,315 A | 11/1994 | Müller-Rees et al. | |
| 5,383,995 A | 1/1995 | Phillips et al. | |
| 5,441,563 A * | 8/1995 | Sideman ................ | C09D 11/03 106/31.4 |
| 5,543,219 A * | 8/1996 | Elwakil ................... | G03G 9/12 428/402.24 |
| 5,569,535 A | 10/1996 | Phillips et al. | |
| 5,571,624 A | 11/1996 | Phillips et al. | |
| 5,997,622 A | 12/1999 | Weber et al. | |
| 6,001,161 A | 12/1999 | Evans et al. | |
| 6,423,246 B1 | 7/2002 | Kasch et al. | |
| 6,732,961 B2 | 5/2004 | Leigeber et al. | |
| 8,246,735 B2* | 8/2012 | Degott ................... | B05D 3/207 106/31.6 |
| 9,617,435 B2* | 4/2017 | Krueger ................... | C09D 7/69 |
| 9,840,632 B2* | 12/2017 | Glassey ................. | C09D 11/12 |
| 2002/0160194 A1* | 10/2002 | Phillips .................. | B42D 25/29 428/403 |
| 2007/0184268 A1* | 8/2007 | Kishimoto .............. | C09C 3/063 428/403 |
| 2014/0183421 A1* | 7/2014 | Lockett ................ | C09D 11/037 252/513 |
| 2016/0009075 A1* | 1/2016 | Lefebvre ................ | B41F 11/02 283/72 |

(Continued)

FOREIGN PATENT DOCUMENTS

| | | | |
|---|---|---|---|
| EP | 0492208 A1 * | 7/1992 | |
| EP | 0340163 | 12/1992 | |
| EP | 0601483 A1 * | 6/1994 | |

(Continued)

OTHER PUBLICATIONS

English translation of EP 0492208, Jul. 1992; 6 pages.*

(Continued)

*Primary Examiner* — Helene Klemanski
(74) *Attorney, Agent, or Firm* — Muncy, Geissler, Olds & Lowe, P.C.

(57) ABSTRACT

The present invention relates to the field of magnetic machine readable oxidative drying suitable for intaglio printing of security documents. In particular, the invention relates to magnetic oxidative drying ink for intaglio printing on a substrate, said magnetic oxidative drying ink having a viscosity in the range of about 3 to about 60 Pa s at 40° C. and 1000 $s^{-1}$ and comprising a) at least one oxidative drying varnish, b) a plurality of core-shell pigment particles comprising a magnetic core and an external layer made of silver and c) one or more stabilizers selected from benzotriazole compounds.

15 Claims, No Drawings

(56) References Cited

U.S. PATENT DOCUMENTS

2018/0273777 A1* 9/2018 Lefebvre .............. C09D 11/037

FOREIGN PATENT DOCUMENTS

| EP | 1046692 A1 * | 10/2000 |
|----|----|----|
| EP | 1213338 A1 * | 6/2002 |
| EP | 2014729 A1 * | 1/2009 |
| JP | S 62/190272 A * | 8/1987 |
| JP | S 63/218766 A * | 9/1988 |
| JP | H 02/80470 * | 3/1990 |
| JP | 2013-151644 A | 8/2013 |
| WO | 2007/022226 A2 | 2/2007 |
| WO | WO 2008/083894 A2 * | 7/2008 |
| WO | WO 2010/115986 A2 * | 10/2010 |
| WO | WO 2014/086556 A1 * | 6/2014 |
| WO | WO 2014/124718 A1 * | 8/2014 |

OTHER PUBLICATIONS

English translation of JPS 62/190272, Aug. 1987; 8 pages.*
English translation of JPS 63/218766, Sep. 1988; 6 pages.*
English translation of JPH 02/80470, Mar. 1990; 5 pages.*
International Search Report and Written Opinion issued with respect to application No. PCT/EP2017/051624; dated Apr. 4, 2017.
Chem. Rev. 99 (1999), G. Pfaff and P. Reynders, pp. 1963-1981.
Japanese Office Action in counterpart Japanese Application No. 2018-535158 dated Sep. 29, 2020 (and English language translation of the Office Action).

* cited by examiner

INTAGLIO MAGNETIC MACHINE READABLE OXIDATIVE DRYING INKS

The present invention relates to the field of the protection of security document against counterfeit and illegal reproduction. In particular, the present invention relates to the field of magnetic machine readable oxidative drying inks suitable for intaglio printing of security documents.

BACKGROUND OF THE INVENTION

Magnetic inks have been widely used in the field of security documents, in particular for banknotes printing, to confer the security document an additional covert security feature. The protection of security document against counterfeit and illegal reproduction provided by covert security features relies on the concept that such features typically require specialized equipment and knowledge for their detection. Due to their magnetic properties, security features printed with a magnetic ink may be machine authenticated, given that magnetism can be easily sensed by electronic means. Examples of the use of magnetic features for banknotes are disclosed in U.S. Pat. No. 3,599,153 and in U.S. Pat. No. 3,618,765. However, commonly used magnetic materials in security inks have a dark optical appearance and may be only used for the production of dark or black security features. Therefore, commonly used magnetic materials in security inks do not allow for the possibility to create pure colors, particularly bright hues as a result of the inherent dark color of the magnetic materials thus limiting the gamut of colors for the design of security documents.

Magnetic security features may be prepared through an intaglio printing process (also referred in the art as engraved copper plate printing and engraved steel die printing), which is capable of depositing a sufficiently high amount of magnetic material on the substrate so as to allow for its detection and sensing.

Intaglio printing processes refer to printing methods used in particular in the field of security documents. The intaglio printing process is known to be the most consistent and high quality printing process for producing fine tapering lines and is therefore the printing technology of choice for fine design in the field of security documents, in particular banknotes and stamps. In particular, one of the distinguishing features of the intaglio printing process is that the layer thickness of the ink transferred to the substrate may be varied from a few micrometers to several tens of micrometers by using correspondingly shallow or deep engravings on the intaglio printing device. As mentioned hereabove, the layer thickness of intaglio printed security features thus allow a sufficiently high amount of material on the substrate for its detection and sensing.

To overcome the dark optical appearance of commonly used magnetic machine readable inks and security features made of said inks, WO 2010/115986 A2 discloses magnetic machine readable intaglio inks comprising magnetic multilayer pigment particles so as to form magnetic layers by intaglio processes, wherein said magnetic layer can be detected and sensed by automatic machinery (machine readability) and do not suffer from a dark appearance. However, intaglio inks comprising magnetic pigment particles with external layer made of silver may suffer from a limited stability.

Oxidative drying inks are commonly used for intaglio printing processes, said inks refer to inks which dry by oxidation in the presence of oxygen, in particular in the presence of the oxygen of the atmosphere. During the drying process, the oxygen combines with one or more components of the ink vehicle, converting the ink to a semi-solid or a solid state. The process may be accelerated by the use of driers also referred in the art as catalysts, siccative agents, desiccatives or dessicators, such as metallic salts and/or by the application of a thermal treatment.

Intaglio oxidative drying inks may suffer from a so-called "set-of" problem which is the transfer of ink from one printed sheet to the back side of the next following printed sheet in the stack, or to the back of an endless sheet in a web. Although this is a problem may be encountered with any industrial printing process such as intaglio printing methods wherein the pronounced relief of the printing method may accentuate the problem of set-off. With the state of the art oxidatively drying intaglio inks, the set-off issues have been reduced through the optimization of the ink formulation; however, deep engraving features may still result in undesirable set-off.

There remains a need for magnetic machine readable oxidative drying inks for intaglio printing processes that combine a good stability upon storage so as to improve the shelf life of said inks, a good stability of intaglio printed security features as well as good drying performance so as to avoid set-off problems.

SUMMARY

Accordingly, it is an object of the present invention to overcome the deficiencies of the prior art discussed above. This is achieved by the provision of taking advantage of one or more benzotriazole compounds having the formula (I) in a magnetic oxidative drying ink for intaglio printing on a substrate, wherein said magnetic oxidative drying ink has a viscosity in the range of about 3 to about 60 Pa s at 40° C. and 1000 s$^{-1}$ and comprises a) at least one oxidative drying varnish, b) a plurality of core-shell pigment particles comprising a magnetic core and an external layer made of silver.

Described herein are magnetic oxidative drying inks for intaglio printing on a substrate said magnetic oxidative drying ink having a viscosity in the range of about 3 to about 60 Pa s at 40° C. and 1000 s$^{-1}$ and comprising a) at least one oxidative drying varnish, b) a plurality of core-shell pigment particles comprising a magnetic core and an external layer made of silver and c) one or more stabilizers selected from benzotriazole compounds having the formula (I)

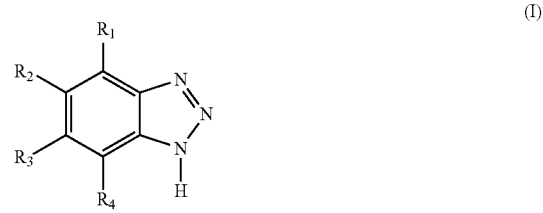

wherein
$R_1$-$R_4$ may be the same or may be different and are independently selected from the group consisting of hydrogen, linear $C_1$-$C_4$ alkyls, branched $C_3$-$C_4$ alkyls, $C_1$-$C_4$ linear haloalkyls, and branched $C_3$-$C_4$ haloalkyls.

Described herein are processes for producing the magnetic oxidative drying inks described herein, said processes comprising a step of dispersing, mixing and/or milling the at least one oxidative drying varnish described herein with the plurality of core-shell pigment particles described herein and the one or more stabilizers selected from benzotriazole compounds having the formula (I) described herein.

Described herein are uses of the one or more benzotriazole compounds described herein as stabilizers in a magnetic oxidative drying ink for intaglio printing on a substrate described herein.

Described herein are security features comprising a layer or coating made of the magnetic oxidative drying ink described herein.

Described herein are processes for producing the security features described herein and security features obtained thereof, said processes comprising a step of applying by an intaglio printing process the magnetic oxidative drying ink described herein on a substrate such as those described herein.

Described herein are uses of the security features described herein for the protection of a security document against counterfeiting or fraud and security documents comprising one or more of the security features described herein.

Described herein are security documents comprising one or more security features described herein.

Described herein are processes for producing the security documents described herein and security documents obtained thereof, said processes comprising a step a) of applying by an intaglio printing process the magnetic oxidative drying ink described herein onto a substrate such as those described herein.

DETAILED DESCRIPTION

The following definitions are to be used to interpret the meaning of the terms discussed in the description and recited in the claims.

As used herein, the article "a" indicates one as well as more than one and does not necessarily limit its referent noun to the singular.

As used herein, the terms "about" means that the amount or value in question may be the value designated or some other value about the same. The phrases are intended to convey that similar values within a range of ±5% of the indicated value promote equivalent results or effects according to the invention.

As used herein, the term "and/or" or "or/and" means that either all or only one of the elements of said group may be present. For example, "A and/or B" shall mean "only A, or only B, or both A and B".

As used herein, the term "at least" is meant to define one or more than one, for example one or two or three.

The term "security feature" is used to denote an image, pattern or graphic element that can be used for authentication purposes.

The term "security document" refers to a document which is usually protected against counterfeit or fraud by at least one security feature. Examples of security documents include without limitation value documents and value commercial goods.

The present invention provides magnetic oxidative drying inks suitable for intaglio printing processes, in particular for intaglio printing processes for producing security features on security documents. The magnetic oxidative drying inks for intaglio printing processes described herein have a viscosity in the range of about 3 to about 60 Pa s at 40° C. and 1000 s$^{-1}$, the viscosities being measured on a Haake Roto-Visco RV1 with a cone plate 1. The magnetic oxidative drying inks described herein comprises at least one oxidative drying varnish such as those described herein, a plurality of core-shell pigment particles comprising a magnetic core and an external layer made of silver such as those described herein, one or more benzotriazole compounds such as those described herein, and optionally one or more compounds, additives and/or ingredients such as those described herein.

The magnetic oxidative drying inks described herein comprise a plurality of core-shell pigment particles comprising a magnetic core and an external layer made of silver. By "external layer", it is meant that said layer faces the environment, i.e. faces the magnetic oxidative drying ink wherein the core-shell pigment particles are dispersed.

The magnetic oxidative drying inks described herein preferably comprise the core-shell pigment particles described herein in an amount from about 3 to about 70 and more preferably from about 5 to about 50 wt-% and still more preferably from about 10 to about 30 wt-%, the weight percents being based on the total weight of the magnetic oxidative drying ink.

The size of the core-shell pigment particles described herein is preferably between about 0.1 and about 30 microns, preferably between about 0.5 and about 15 microns.

The magnetic cores described herein are made of one or more soft-magnetic, semi-hard (12.5-125 Oe) or hard-magnetic type (ideally, but not limited to, 2 to 5000 Oe) materials. The magnetic cores described herein preferably comprise one or more magnetic materials selected from the group consisting of magnetic metals (in particular iron, cobalt and nickel); magnetic metal oxides (in particular $FeO_{23}$, $Fe_3O_4$, $CrO_2$, hexaferrites such as for example barium hexaferrites and strontium hexaferrites, perovskites and $A_3B_5O_{12}$ garnets, wherein A is a trivalent rare earth ion and B is $A^{3+}$, $Cr^{3+}$, $Fe^{3+}$, $Ga^{3+}$ or $Bi^{3+}$); magnetic metal alloys (in particular iron alloys, iron-nickel alloys, iron-cobalt alloys, nickel-cobalt alloys, iron-nickel alloy nitrides and iron-nickel-cobalt alloy nitrides) and mixtures or combinations thereof. More preferably, the magnetic cores described herein comprise one or more magnetic materials selected from the group consisting of iron, $Fe_2O_3$ and $Fe_3O_4$ and mixtures or combinations thereof.

According to one embodiment, the core-shell pigment particles described herein preferably comprises a magnetic core such as those described herein, a first layer (intermediate layer) made of one or more inorganic materials and a second layer (external layer facing the environment) made of silver, wherein the one or more inorganic materials are preferably selected from the group consisting of metals selected from the group consisting of silver, aluminum, nickel, palladium, platinum, palladium, copper, gold, rhodium, zinc, iridium and their alloys; metal oxides (preferably selected from the group consisting of MgO and ZnO, $Al_2O_3$, $Y_2O_3$. $Ln_2O_3$ (wherein Ln is a lanthanide), $SiO_2$, $TiO_2$, $ZrO_2$, $CeO_2$ and mixtures thereof) and metal sulfides (preferably selected from the group consisting of ZnS; CaS and mixtures thereof). Preferably, the core-shell pigment particles described herein preferably comprises a magnetic core, a first layer (intermediate layer) made of one or more inorganic materials and an external layer made of silver, wherein the one or more inorganic materials are metal oxides such as those described hereabove and preferably selected from the group consisting of $SiO_2$, $TiO_2$ and $Y_2O_3$.

According to another embodiment, the core-shell pigment particles described herein preferably comprises a magnetic core, a first layer (intermediate layer) made of one or more organic materials and a second layer (external layer facing the environment) made of silver, wherein the one or more organic materials are preferably selected from the group consisting of polyacrylates (preferably poly(methyl methacrylate, PMMA), polystyrenes, parylenes, alkoxysilanes (preferably 3-methacryloxypropyl trimethoxysilane, TMP), and combinations thereof, more preferably the one or more organic materials are selected from the group consisting of poly(methyl methacrylate) and 3-methacryloxypropyl trimethoxysilane.

All suitable deposition processes (physical and/or chemical) can be used to deposit silver layers, organic layers and inorganic layers onto the magnetic core described herein. Typical examples of deposition processes or coating process include without limitation chemical vapor deposition (CVD) and wet-chemical coating. In the case of forming an organic material layer, these core-shell pigment particles may be prepared by a method consisting of dispersing the magnetic cores described herein in a liquid phase and an organic layer is formed on the particles by emulsion polymerization (liquid-phase polymerization method), or by a method in which the organic layer is formed in a vapor phase (CVD or PVD), or of still others methods known by the skilled one in the art.

In a particularly preferred embodiment, the magnetic oxidative drying ink described herein comprises the core-shell pigment particles described herein, wherein said particles have a bulk lightness L* higher than 60 according to the CIELAB (1976) scale, preferably higher than 75, most preferably higher than 80.

In a preferred embodiment of the present invention the ink has a diffuse infrared (IR) reflectance between 800 and 1000 nm, which is higher than 50%, preferably higher than 60%.

The oxidative drying inks described herein comprise one or more one or more stabilizers selected from benzotriazole compounds having the formula (I):

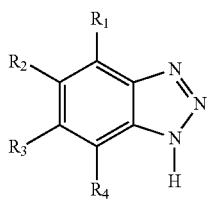

(I)

wherein
$R_1$-$R_4$ may be the same or may be different and are independently selected from the group consisting of
hydrogen,
linear $C_1$-$C_4$ alkyls,
branched $C_3$-$C_4$ alkyls,
$C_1$-$C_4$ linear haloalkyls, wherein the halo atom is preferably independently selected from the group consisting of fluorine, chlorine and bromine, more preferably fluorine and branched $C_3$-$C_4$ haloalkyls, wherein the halo atom is preferably independently selected from the group consisting of fluorine, chlorine and bromine, more preferably fluorine.

As used herein, the term "linear $C_1$-$C_4$ alkyls" refers to linear alkyl groups having from one to four carbon atoms, i.e. methyl, ethyl, propyl and butyl groups.

As used herein, the term "branched $C_3$-$C_4$ alkyls" refers to branched alkyl groups having three or four carbon atoms, i.e. isopropyl, isobutyl, sec-butyl and tert-butyl groups.

As used herein, the term "$C_1$-$C_4$ linear haloalkyls" refers to linear alkyl groups having from one to four carbon atoms, wherein one or more hydrogen atoms have been replaced by a halo atom.

As used herein, the term "branched $C_3$-$C_4$ haloalkyls" refers to branched alkyl groups having three or four carbon atoms, wherein one or more hydrogen atoms have been replaced by a halo atom.

It should further be appreciated that the invention also extends to compounds in which one or more of the atoms have been replaced by an isotopic variant, such as for example one or more hydrogen atoms may be replaced by $^2H$ or $^3H$ and/or one or more carbon atoms may be replaced by $^{14}C$ or $^{13}C$.

Preferably, the oxidative drying inks described herein comprise one or more one or more stabilizers selected from benzotriazole compounds having the formula (I):

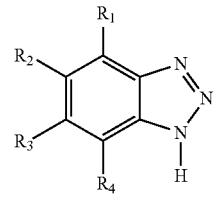

(I)

wherein
$R_1$-$R_4$ may be the same or may be different and are independently selected from the group consisting of
hydrogen,
linear $C_1$-$C_2$ alkyls, and
$C_1$-$C_2$ linear haloalkyls, wherein the halo atom is preferably independently selected from the group consisting of fluorine, chlorine and bromine, more preferably fluorine.

More preferably, the oxidative drying inks described herein comprise one or more one or more stabilizers selected from benzotriazole compounds having the formula (I):

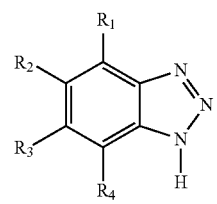

(I)

wherein
$R_1$-$R_4$ may be the same or may be different and are independently selected from the group consisting of hydrogen,
$C_1$ alkyls (i.e. methyl groups), and
$C_1$ haloalkyls (i.e. halomethyl groups), wherein the halo atom is preferably independently selected from the group consisting of fluorine, chlorine and bromine, more preferably fluorine.

According to one embodiment, the one or more benzotriazole compounds described herein comprise $R_1$-$R_4$, wherein $R_1$-$R_4$ are hydrogens.

According to another embodiment, the one or more benzotriazole compounds described herein comprise $R_1$-$R_4$, wherein three radicals of $R_1$-$R_4$ are hydrogens and one radical is a methyl or ethyl group, preferably a methyl group.

According to another embodiment, the one or more benzotriazole compounds described herein comprise $R_1$-$R_4$, wherein three radicals of $R_1$-$R_4$ are hydrogens and one radical is a halomethyl group, preferably a trihalomethyl group and more preferably a trifluoromethyl group.

Also described herein are uses of the one or more benzotriazole compounds having the formula (I) described herein as stabilizers for the magnetic oxidative drying inks described herein for printing by an intaglio process on a substrate.

The magnetic oxidative drying inks described preferably comprises the one or more benzotriazole compounds described herein in an amount from about 0.1 to about 20 wt-%, preferably from about 0.5 to about 10 and still more preferably from about 1 to about 5 wt-%, the weight percents being based on the total weight of the oxidative drying ink.

The magnetic oxidative drying inks described herein comprise at least one oxidative drying varnish. The term "varnish" is also referred in the art as resin, binder or ink vehicle. The at least one oxidative drying varnish is preferably present in the oxidatively drying inks described herein in an amount from about 10 to about 90 wt-%, the weight percents being based on the total weight of the magnetic oxidative drying ink.

The oxidative drying varnishes for the oxidatively drying inks described herein are drying varnishes, i.e. vanishes that cure under the action of oxygen, for instance oxygen from the air ("air-drying"). Alternatively, and with the aim of accelerating the drying process, the drying process may be performed under hot air, an infrared source or any combination of hot air and an infrared source.

Oxidative drying varnishes are typically polymers comprising unsaturated fatty acid residues, saturated fatty acids residues or mixtures thereof, as generally known in the art. Preferably the oxidative drying varnishes described herein comprise unsaturated fatty acid residues to ensure the air drying properties. Particularly preferred oxidative drying varnishes are resins comprising unsaturated acid groups, even more preferred are resins comprising unsaturated carboxylic acid groups. However the resins may also comprise saturated fatty acids residues. Preferably the oxidative drying varnishes described herein comprise acid groups, i.e. the oxidative drying varnishes are selected among acid modified resins. The oxidative drying varnishes described herein may be selected from the group consisting of alkyd resins, vinyl polymers, polyurethane resins, hyperbranched resins, rosin-modified maleic resins, rosin-modified phenol resins, rosin ester, petroleum resin-modified rosin ester, petroleum resin-modified alkyd resin, alkyd resin-modified rosin/phenol resin, alkyd resin-modified rosin ester, acrylic-modified rosin/phenol resin, acrylic-modified rosin ester, urethane-modified rosin/phenol resin, urethane-modified rosin ester, urethane-modified alkyd resin, epoxy-modified rosin/phenol resin, epoxy-modified alkyd resin, terpene resins nitrocellulose resins, polyolefins, polyamides, acrylic resins and combinations or mixtures thereof. Polymers and resins are herein interchangeably used.

Saturated and unsaturated fatty acid compounds may be obtained from natural and/or artificial sources. Natural sources include animal sources and/or plant sources. Animal sources may comprise animal fat, butter fat, fish oil, lard, liver fats, tuna fish oil, sperm whale oil and/or tallow oil and waxes. Plant sources may comprise waxes and/or oils such as vegetable oils and/or non-vegetable oils. Examples of plant oils include without limitation bitter gourd, borage, calendula, canola, castor, china wood, coconut, conifer seed, corn, cottonseed, dehydrated castor, flaxseed, grape seed, *Jacaranda mimosifolia* seed, linseed oil, palm, palm kernel, peanut, pomegranate seed, rapeseed, safflower, snake gourd, soya (bean), sunflower, tall, tung and wheat germ. Artificial sources include synthetic waxes (such as micro crystalline and/or paraffin wax), distilling tail oil and/or chemical or biochemical synthesis methods. Suitable fatty acids also include (Z)-hexadan-9-enoic[palmitoleic]acid ($C_{16}H_{30}O_2$), (Z)-octadecan-9-enoic[oleic]acid ($C_{18}H_{34}O_2$), (9Z,11E,13E)-octadeca-9,11,13-trienoic[α-eleostearic]acid ($C_{18}H_{30}O_2$), licanic acid, (9Z,12Z)-octadeca-9,12-dienoic [inoeic]acid ($C_{18}H_{32}O_2$), (5Z,8Z,11Z,14Z)-eicosa-5,8,11,14-tetraenoic[arachidonic]acid ($C_{20}H_{32}O_2$), 12-hydroxy-(9Z)-octadeca-9-enoic[ricinoleic]acid ($C_{18}H_{34}O_3$), (Z)-docosan-13-enoic[erucic]acid ($C_{22}H_{42}O_3$), (Z)-eicosan-9-enoic[gadoleic]acid ($C_{20}H_{38}O_2$), (7Z,10Z,13Z,16Z,19Z)-docosa-7,10,13,16,19-pentaenoic[clupanodonic] acid and mixtures thereof.

Suitable fatty acids are ethylenically unsaturated conjugated or non-conjugated C2-C24 carboxylic acids, such as myristoleic, palmitoleic, arachidonic, erucic, gadoleic, clupanadonic, oleic, ricinoleic, linoleic, linolenic, licanic, nisinic acid and eleostearic acids or mixtures thereof. Those fatty acids are typically used in the form of mixtures of fatty acids derived from natural or synthetic oils.

The magnetic oxidative drying inks described herein preferably comprise one or more driers (also referred in the art as catalysts, siccatives, siccative agents, desiccatives or dessicators) to speed up the oxidation process. Examples of driers include inorganic or organic salts of metal(s), metallic soaps of organic acids, metal complexes and metal complex salts. Suitable driers include without limitation polyvalent salts containing cobalt, calcium, copper, zinc, iron, zirconium, manganese, barium, zinc, strontium, lithium, vanadium and potassium as the cation(s); and halides, nitrates, sulphates, carboxylates like acetates, ethylhexanoates, octanoates and naphtenates or acetoacetonates as the anion(s). When present, the one or more driers used in the magnetic oxidative drying ink described herein are preferably present in an amount from about 0.01 to about 10 wt-%, more preferably in an amount from about 0.1 to about 5 wt-%, the weight percents being based on the total weight of the magnetic oxidative drying ink.

The magnetic oxidative drying inks described herein may further comprise one or more surfactants, in particular hydrophilic macromolecular surfactants such as those described e.g. in EP 0 340 163 BI. The role of the optional surfactants is to help wiping off the excess of ink present on the printing cylinder just before contacting said printing cylinder with the substrate. This process of wiping off the excess of ink is part of any high-speed, industrial intaglio printing process and is carried out using a tissue or a paper roll ("calico"), or a polymer wiping cylinder and a cleansing water-based solution ("wiping solution"). In this case, the optional surfactants are used to emulsify the excess of ink in the cleansing solution. Said surfactants may be nonionic, anionic or cationic as well as zwitterionic ones. In the case of hydrophilic macromolecular surfactants, the functional groups are for example carboxylic or sulfonic acid groups, hydroxyl groups, ether groups or primary, secondary, tertiary or quaternary amino groups. The acid groups may be neutralized with amines, alcanolamines or preferably inorganic bases, or combinations thereof. Primary, secondary and tertiary amino groups may be neutralized with inorganic or organic acids such as sulfonic acids, formic acid, acetic acid, trifluoroacetic acid and others. Particularly preferred are anionic macromolecular surfactants (AMS), such as those described in EP 2 014 729 A1.

The magnetic oxidative drying inks described herein may be color constant inks or optically variable inks.

According to one aspect of the present invention, the magnetic oxidative drying inks described herein are color constant composition inks preferably comprising a) one or more dyes, and/or b) inorganic pigments, organic pigments or mixtures thereof. Dyes suitable for inks are known in the art and are preferably selected from the group comprising reactive dyes, direct dyes, anionic dyes, cationic dyes, acid dyes, basic dyes, food dyes, metal-complex dyes, solvent dyes and mixtures thereof. Typical examples of suitable dyes include without limitation coumarines, cyanines, oxazines, uranines, phtalocyanines, indolinocyanines, triphenylmethanes, naphtalocyanines, indonanaphtalo-metal dyes, anthraquinones, anthrapyridones, azo dyes, rhodamines, squarilium dyes, croconium dyes. Typical examples of dyes suitable for the present invention include without limitation C.I. Acid Yellow 1, 3, 5, 7, 11, 17, 19, 23, 25, 29, 36, 38, 40, 42, 44, 49, 54, 59, 61, 70, 72, 73, 75, 76, 78, 79, 98, 99, 110, 111, 121, 127, 131, 135, 142, 157, 162, 164, 165, 194, 204, 236, 245; C.I. Direct Yellow 1, 8, 11, 12, 24, 26, 27, 33, 39, 44, 50, 58, 85, 86, 87, 88, 89, 98, 106, 107, 110, 132, 142, 144; C.I. Basic Yellow 13, 28, 65; C.I. Reactive Yellow 1, 2, 3, 4, 6, 7, 11, 12, 13, 14, 15, 16, 17, 18, 22, 23, 24, 25, 26, 27, 37, 42; C.I. Food Yellow 3, 4; C.I. Acid Orange 1, 3, 7, 10, 20, 76, 142, 144; C.I. Basic Orange 1, 2, 59; C.I. Food Orange 2; C.I. Orange B; C.I. Acid Red 1, 4, 6, 8, 9, 13, 14, 18, 26, 27, 32, 35, 37, 42, 51, 52, 57, 73, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 221, 249, 252, 254, 262, 265, 274, 282, 289, 303, 317, 320, 321, 322, 357, 359; C.I. Basic Red 1, 2, 14, 28; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, 231, 253; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, 64, 108, 180; C.I. Food Red 1, 7, 9, 14; C.I. Acid Blue 1, 7, 9, 15, 20, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 193, 199, 203, 204, 205, 229, 234, 236, 249, 254, 285; C.I. Basic Blue 1, 3, 5, 7, 8, 9, 11, 55, 81; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, 46, 77; C.I. Food Blue 1, 2; C.I. Acid Green 1, 3, 5, 16, 26, 104; C.I. Basic Green 1, 4; C.I: Food Green 3: C.I. Acid Violet 9, 17, 90, 102, 121: C.I. Basic Violet 2, 3, 10, 11, 21: C.I. Acid Brown 101, 103, 165, 266, 268, 355, 357, 365, 384; C.I. Basic Brown 1; C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, 191, 194; C.I. Direct Black 17, 19, 22, 32, 39, 51, 56, 62, 71, 74, 77, 94, 105, 106, 107, 108, 112, 113, 117, 118, 132, 133, 146, 154, 168; C.I. Reactive Black 1, 3, 4, 5, 6, 8, 9, 10, 12, 13, 14, 18, 31; C.I. Food Black 2; C.I. Solvent Yellow 19, C.I. Solvent Orange 45, C.I. Solvent Red 8, C.I. Solvent Green 7, C.I. Solvent Blue 7, C.I. Solvent Black 7; C.I. Disperse Yellow 3, C.I. Disperse Red 4, 60, C.I. Disperse Blue 3, and metal azo dyes disclosed in U.S. Pat. Nos. 5,074,914, 5,997,622, 6,001,161, JP 02-080470, JP 62-190272, JP 63-218766. Suitable dyes for the present invention may be infrared absorbing dyes or luminescent dyes. When present, the one or more dyes used in the magnetic oxidative drying ink described herein are preferably present in an amount from about 1 to about 20 wt-%, the weight percents being based on the total weight of the magnetic oxidative drying ink.

Typical examples of organic and inorganic pigments include without limitation C.I. Pigment Yellow 12, C.I. Pigment Yellow 42, C.I. Pigment Yellow 93, 109, C.I. Pigment Yellow 110, C.I. Pigment Yellow 147, C.I. Pigment Yellow 173, C.I. Pigment Orange 34, C.I. Pigment Orange 48, C.I. Pigment Orange 49, C.I. Pigment Orange 61, C.I. Pigment Orange 71 C.I. Pigment Orange 73, C.I. Pigment Red 9, C.I. Pigment Red 22, C.I. Pigment Red 23, C.I. Pigment Red 67, C.I. Pigment Red 122, C.I. Pigment Red 144, C.I. Pigment Red 146, C.I. Pigment Red 170, C.I. Pigment Red 177, C.I. Pigment Red 179, C.I. Pigment Red 185, C.I. Pigment Red 202, C.I. Pigment Red 224, C.I. Pigment Brown 6, C.I. Pigment Brown 7, C.I. Pigment Red 242, C.I. Pigment Red 254. C.I. Pigment Red 264, C.I. Pigment Brown 23, C.I. Pigment Blue 15, C.I. Pigment Blue 15:3, C.I. Pigment Blue 60, C.I. Pigment Violet 19, C.I. Pigment Violet 23, C.I. Pigment Violet 32, C.I. Pigment Violet 37, C.I. Pigment Green 7, C.I. Pigment Green 36, C.I. Pigment Black 7, C.I. Pigment Black 11, C. I. Pigment White 4, C.I. Pigment White 6, C.I. Pigment White 7, C.I. Pigment White 21, C. I. Pigment White 22, antimony yellow, lead chromate, lead chromate sulfate, lead molybdate, ultramarine blue, cobalt blue, manganese blue, chrome oxide green, hydrated chrome oxide green, cobalt green, cerium sulfide, cadmium sulfide, cadmium sulfoselenides, zinc ferrite, bismuth vanadate, Prussian blue, mixed metal oxides, azo, azomethine, methine, anthraquinone, phthalocyanine, perinone, perylene, diketopyrrolopyrrole, thioindigo, thiazinindigo, dioxazine, iminoisoindoline, iminoisoindolinone, quinacridone, flavanthrone, indanthrone, anthrapyrimidine and quinophthalone pigments. When present, the inorganic pigments, organic pigments or mixtures thereof described herein are preferably present in an amount from about 0.1 to about 45 wt-%, the weight percents being based on the total weight of the oxidative drying ink.

According to one aspect of the present invention, the magnetic oxidative drying inks described herein are optically variable inks and comprise optically variable pigments or a mixture of different optically variable pigments. Optically variable inks may further comprise one or more color constant pigments. Optically variable inks preferably comprise optically variable pigments or a mixture of different optically variable pigments, wherein the optically variable pigments are preferably selected from the group consisting of thin film interference pigments, interference coated pigments, cholesteric liquid crystal pigments and mixtures thereof. When present the optically variable pigments are preferably comprised in the magnetic oxidative drying ink described herein in an amount between about 5 and about 40 wt-% and more preferably in an amount between about 10 and about 35 wt-%, the weight percents being based on the total weight of the magnetic oxidative drying ink.

Suitable thin film interference pigments exhibiting optically variable characteristics are known to those skilled in the art and disclosed in U.S. Pat. Nos. 4,705,300; 4,705,356; 4,721,271; 5,084,351; 5,214,530; 5,281,480; 5,383,995; 5,569,535, 5,571,624 and in the thereto related documents. When at least a part of the optically variable pigments consists of thin film interference pigments, it is preferred that the thin film interference pigments comprise a Fabry-Perot reflector/dielectric/absorber multilayer structure and more preferably a Fabry-Perot absorber/dielectric/reflector/ dielectric/absorber multilayer structure, wherein the absorber layers are partially transmitting and partially reflecting, the dielectric layers are transmitting and the reflective layer is reflecting the incoming light. Preferably, the reflector layer is selected from the group consisting of metals, metal alloys and combinations thereof, preferably selected from the group consisting of reflective metals, reflective metal alloys and combinations thereof and more preferably selected from the group consisting of aluminum (Al), chromium (Cr), nickel (Ni), and mixtures thereof and still more preferably aluminum (Al). Preferably, the dielectric layers are independently selected from the group consisting of magnesium fluoride ($MgF_2$), silicium dioxide ($SiO_2$) and mixtures thereof and more preferably magnesium fluoride ($MgF_2$). Preferably, the absorber layers are independently selected from the group consisting of chromium (Cr), nickel (Ni), metallic alloys and mixtures thereof and more preferably chromium (Cr). When at least a part of the optically variable pigments consists of thin film interference pigments, it is particularly preferred that the thin film interference pigments comprise a Fabry-Perot absorber/dielectric/reflector/dielectric/absorber multilayer structure consisting of a $Cr/MgF_2/Al/MgF_2/Cr$ multilayer structure.

Thin film interference pigments described herein are typically manufactured by vacuum deposition of the different required layers onto a web. After deposition of the desired number of layers, the stack of layers is removed from the web, either by dissolving a release layer in a suitable solvent, or by stripping the material from the web. The so-obtained material is then broken down to flakes which have to be further processed by grinding, milling or any suitable method. The resulting product consists of flat flakes with broken edges, irregular shapes and different aspect ratios.

Suitable interference coated pigments include without limitation structures consisting of a substrate selected from the group consisting of metallic cores such as titanium, silver, aluminum, copper, chromium, iron, germanium, molybdenum, tantalum or nickel coated with one or more layers made of metal oxides as well as structure consisting of a core made of synthetic or natural micas, other layered silicates (e.g. talc, kaolin and sericite), glasses (e.g. borosilicates), silicium dioxides ($SiO_2$), aluminum oxides ($Al_2O_3$), aluminum oxides/hydroxides (boehmite), titanium oxides ($TiO_2$), graphites and mixtures thereof coated with one or more layers made of metal oxides (e.g. titanium oxide, zirconium oxide, tin oxide, chromium oxide, nickel oxide, copper oxide, iron oxide and iron oxide/hydroxide). The structures described hereabove have been described for example in Chem. Rev. 99 (1999). G. Pfaff and P. Reynders, pages 1963-1981 and WO 2008/083894 A2. Typical examples of these interference coated pigments include without limitation silicium oxide cores coated with one or more layers made of titanium oxide, tin oxide and/or iron oxide; natural or synthetic mica cores coated with one or more layers made of titanium oxide, silicium oxide and/or iron oxide, in particular mica cores coated with alternate layers made of silicium oxide and titanium oxide; borosilicate cores coated with one or more layers made of titanium oxide, silicium oxide and/or tin oxide; and titanium oxide cores coated with one or more layers made of iron oxide, iron oxide/hydroxide, chromium oxide, copper oxide, cerium oxide, aluminum oxide, silicium oxide, bismuth vanadate, nickel titanate, cobalt titanate and/or antimony-doped, fluorine-doped or indium-doped tin oxide; aluminum oxide cores coated with one or more layers made of titanium oxide and/or iron oxide.

Liquid crystals in the cholesteric phase exhibit a molecular order in the form of a helical superstructure perpendicular to the longitudinal axes of its molecules. The helical superstructure is at the origin of a periodic refractive index modulation throughout the liquid crystal material, which in turn results in a selective transmission/reflection of determined wavelengths of light (interference filter effect). Cholesteric liquid crystal polymers can be obtained by subjecting one or more crosslinkable substances (nematic compounds) with a chiral phase to alignment and orientation. The particular situation of the helical molecular arrangement leads to cholesteric liquid crystal materials exhibiting the property of reflecting a circularly polarized light component within a determined wavelength range. The pitch can be tuned in particular by varying selectable factors including the temperature and solvents concentration, by changing the nature of the chiral component(s) and the ratio of nematic and chiral compounds. Crosslinking under the influence of UV radiation freezes the pitch in a predetermined state by fixing the desired helical form so that the color of the resulting cholesteric liquid crystal materials is no longer depending on external factors such as the temperature. Cholesteric liquid crystal materials may then be shaped to cholesteric liquid crystal pigments by subsequently comminuting the polymer to the desired particle size. Examples of films and pigments made from cholesteric liquid crystal materials and their preparation are disclosed in U.S. Pat. Nos. 5,211,877; 5,362,315 and 6,423,246 and in EP 1 213 338 A1; EP 1 046 692 A1 and EP 0 601 483 A1, the respective disclosure of which is incorporated by reference herein.

The magnetic oxidative drying inks described herein may further comprise one or more fillers and/or extenders preferably selected from the group consisting of carbon fibers, talcs, micas (e.g. muscovites), wollastonites, calcinated clays, china days, kaolins, carbonates (e.g. calcium carbonate, sodium aluminum carbonate), silicates (e.g. magnesium silicate, aluminum silicate), sulfates (e.g. magnesium sulfate, barium sulfate), titanates (e.g. potassium titanate), alumina hydrates, silica, fumed silica, montmorillonites, graphites, anatases, rutiles, bentonites, vermiculites, zinc whites, zinc sulphides, wood flours, quartz flours, natural fibers, synthetic fibers and combinations thereof. When present, the one or more fillers or extenders are preferably present in an amount from about 0.1 to about 40 wt-%, the weight percents being based on the total weight of the magnetic oxidative drying ink.

The magnetic oxidative drying inks described herein may further comprise one or more waxes preferably selected from the group consisting of synthetic waxes, petroleum waxes and natural waxes. Preferably the one or more waxes are selected from the group consisting of microcrystalline waxes, paraffin waxes, polyethylene waxes, fluorocarbon waxes, polytetrafluoroethylene waxes, Fischer-Tropsch waxes, silicone fluids, beeswaxes, candelilla waxes, montan waxes, carnauba waxes and mixtures thereof. When present, the one or more waxes are preferably present in an amount from about 0.1 to about 15 wt-%, the weight percents being based on the total weight of the oxidative drying ink.

The magnetic oxidative drying inks described herein may further comprise one or more forensic markers and/or one or more taggants.

The magnetic oxidative drying inks described herein may further comprise one or more additives including without limitation compounds and materials which are used for adjusting physical, rheological and chemical parameters of the composition such as the viscosity (e.g. solvents, diluents and surfactants), the consistency (e.g. anti-settling agents, filers and plasticizers), the foaming properties (e.g. anti-foaming agents), UV stability (photostabilizers) and adhesion properties, etc. Additives described herein may be present in the magnetic oxidative drying inks disclosed herein in amounts and in forms known in the art, including in the form of so-called nano-materials where at least one of the dimensions of the particles is in the range of 1 to 1000 nm.

The present invention further provides methods for producing the magnetic oxidative drying inks described herein and magnetic oxidative drying inks obtained therefrom. The method comprises a step of dispersing, mixing and/or milling the at least one oxidative drying varnish described herein, the core-shell pigment particles, the one or more stabilizers and the one or more additives when present thus forming pasty compositions.

The magnetic oxidative drying inks described herein are particularly suitable to be applied by an intaglio printing processes onto a substrate, in particular the magnetic oxidative drying inks described herein are particularly suitable to be applied by an intaglio printing processes onto a substrate so as to produce a security feature.

Suitable substrates for the present invention include without limitation papers or other fibrous materials such as cellulose, paper-containing materials, plastic or polymer substrates, composite materials, metals or metalized materials, glasses, ceramics and combinations thereof. Typical examples of plastic or polymer substrates are substrates made of polypropylene (PP), polyethylene (PE), polycarbonate (PC), polyvinyl chloride (PVC) and polyethylene terephthalate (PET). Typical examples of composite materials include without limitation multilayer structures or laminates of paper and at least one plastic or polymer material such as those described hereabove as well as plastic and/or polymer fibers incorporated in a paper-like or fibrous material such as those described hereabove. With the aim of further increasing the security level and the resistance against counterfeiting and illegal reproduction of security documents, the substrate may contain watermarks, security threads, fibers, planchettes, luminescent compounds, windows, foils, decals, coatings and combinations thereof.

Also described herein are security features made of the magnetic oxidative drying ink described herein and security documents comprising one or more of said security features. Also described herein are uses of the security features described herein for the protection of a security document against fraud or illegal reproduction.

Also described herein are methods for producing a security feature and security features obtained thereof. The method described herein comprises a step a) of applying by an intaglio printing process the magnetic oxidative drying ink described herein onto a substrate such as those described herein. The method preferably further comprises a step b) of drying the magnetic oxidative drying ink described herein in the presence of air so as to form a layer or coating on the substrate said step of drying being performed after the step a). The step b) of drying the magnetic oxidative drying ink described may be performed under hot air, with an infrared source or any combination of hot air and an infrared source so as to decrease the drying time of said inks.

Intaglio printing refers to a printing method used in particular in the field of printing security documents. In an industrial intaglio printing process, a rotating steel cylinder carrying a plate engraved with a pattern or image to be printed is supplied with ink by one or by a plurality of selective inking cylinder(s) (or chablon cylinders), each selective inking cylinder being inked in at least one corresponding color to features. Subsequently to the inking step, the intaglio printing process involves a step of wiping off any ink excess present on the surface of the intaglio printing device, said step being carried out using a paper or a tissue ("calico") or a polymeric roll ("wiping cylinder"). Subsequently, the plate is brought into contact with a substrate such as those described herein, in sheet form or web form, and the ink is transferred under pressure from the engravings of the intaglio printing device onto the substrate to be printed forming a thick security feature on the substrate.

The step of applying by an intaglio printing process the magnetic oxidative drying ink described herein onto a substrate such as those described herein is typically performed with an intaglio plate having zones of different engraving depth such as to result in a security feature having printed zones of different levels of magnetic signal.

Also described herein are security features made of the magnetic oxidative drying ink described herein. Also described herein are uses of the security features described herein for the protection of a security document against fraud or illegal reproduction.

According to one embodiment, the magnetic oxidative drying ink described herein may be used to produce a security feature in the form of a magnetic code for a security thread or stripe, wherein said magnetic code comprises non-adjacent magnetic areas made of the magnetic oxidative drying ink described herein and areas free from said ink, wherein both areas are arranged along a predetermined direction which extends along the longwise direction of the security thread or stripe. Magnetic codes may be used as security elements to be incorporated into or onto security documents to be protected against counterfeiting or illegal reproduction and to be authenticated. In an embodiment, the magnetic areas are arranged as bands extending across the stripe or thread and spaced in the longwise direction of the security thread or stripe, with the spacing forming bands free from magnetic oxidative drying ink. The magnetic areas of the magnetic code serve to store information for automatic reading, decoding or recognition by a device that detects magnetic variations on the security thread or stripe.

Also described herein are security documents comprising one or more security features made of the magnetic oxidative drying ink described herein such as those described herein.

The term "security document" refers to a document having a value such as to render it potentially liable to attempts at counterfeiting or illegal reproduction and which is usually protected against counterfeit or fraud by one or more security features. Examples of security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, bank cards, credit cards, transactions cards, access documents, security badges, entrance tickets, transportation tickets or titles, and the like.

The term "value commercial good" refers to packaging material, in particular for pharmaceutical, cosmetics, electronics or food industry that may comprise one or more security features in order to warrant that the content of the packaging is genuine, like for instance genuine drugs. Example of these packaging material include without limitation labels such as authentication brand labels, tax banderoles, tamper evidence labels and seals.

The security document described herein may further comprise one or more additional layers or coatings either below or on top of the security feature made of the magnetic oxidative drying ink described herein. Should the adhesion between the substrate and the security feature described herein be insufficient, for example, due to the substrate material, a surface unevenness or a surface inhomogeneity, an additional layer, coating or a primer between the substrate and the security feature might be applied as known for those skilled in the art.

With the aim of increasing the durability through resistance against soiling or chemicals and the cleanliness and thus the circulation lifetime of security documents, one or more protective layers may be applied on top of the one or more security features described herein. When present, the one or more protective layers are typically made of protective varnishes which may be transparent or slightly colored or tinted and may be more or less glossy. Protective varnishes may be radiation curable compositions, thermal drying compositions or any combination thereof. Preferably, the one or more protective layers are made of radiation curable, more preferably UV-Vis curable compositions.

EXAMPLES

The present invention is now described in more details with reference to non-limiting examples. The Examples below provide greater details for the use of the one or more benzotriazole compounds of formula (I) described herein as stabilizers for magnetic oxidative drying inks for intaglio printing (Examples E1-E3) in comparison with inks comprising different stabilizers (C1-C4) or lacking a stabilizer (C0a, C0b and C0c).

The amount of the stabilizers, the core-shell pigment particles, the colored pigments, the driers and filler was kept constant for all the experimental data.

Intaglio Magnetic Oxidatively Drying Inks (Tables 1a, 1b and 1c)

The intaglio magnetic oxidatively drying inks (E1a, E1b, E1c, E2, E3, C0a, C0b, C0c, C1, C2 and C3) comprised core-shell pigment particles, wherein said core-shell pigment particles were prepared by a two-step process:

1) TiO2 Coating $TiO_2$-coated iron was prepared by dispersing 80 g of iron particles (synthesized from carbonyl iron, $d_{50}$ 1-10 µm) in a 2 L solution of anhydrous ethanol comprising 1.2 mL 0.4 M Lutensol® ON 50 (BASF). After about 15 minutes of vigorous stirring, 2.4 mL of titanium isopropoxide (TTIP, Sigma Aldrich) were added. The reaction was stirred under nitrogen at room temperature for about two hours and was stirred at room temperature one night in air.

2) Silver Coating 70 g of the $TiO_2$-coated iron particles obtained during the first step were dispersed in 280 mL of distilled water. 1000 mL of a silver nitrate solution (280 mL of ammonium hydroxide 28 wt-% and 720 mL of silver nitrate (8.7 wt-%. Fisher)) were added dropwise at 70° C. under vigorous stirring. After an additional hour of stirring at 70° C., 280 mL of a D-glucose solution (28 wt-%, Acros) was added. The so-obtained yellow precipitate was allowed to cool to room temperature under stirring, filtered, washed with distilled water and dried at 80° C. for about 16 hours so as to obtain the silver coated iron particles having a spherical shape and having a $d_{50}$ value of 1-12 µm.

The intaglio magnetic oxidatively drying inks (E1a, E1b, E1c, E2, E3, C0a, C0b, C0c, C1, C2 and C3) were prepared by thoroughly mixing the compounds listed in Table 1a, 1b, and 1c, respectively, by hand with a spatula until they were visually homogeneous. The resulting pasty inks were independently grinded on a three-roll mill (Bühler 200 SDV) in two passes (first pass at 6 bars and second pass at 12 bars).

The viscosity of the so-obtained intaglio magnetic oxidatively drying inks was measured on a Haake Roto Visco 1 rotational rheometer (40° C. and 1000 $s^{-1}$, C20-0.5°, plate cone of 20 mm, truncated at 25 µm). Viscosity values are provided in Table 1a, 1 and 1c.

Preparation of Drawdown Samples

With the aim of simulating an intaglio printed layer, a drop of about 0.2 g of each intaglio magnetic oxidatively drying ink described in Tables 1a, 1b and 1c was deposited on a 14.7 cm×10.5 cm piece of standard offset paper (120 µm thick, supplier: Jeco Print Sàrl). Each intaglio magnetic oxidatively drying ink described in Tables 1a, 1b and 1c was pulled down using a wide blade draw-down knife with a light hand pressure to form an ink layer of about 8 cm length, 2 cm width and 40 to 60 µm thickness.

Natural Ageing

The drawdown samples were allowed to dry in the dark for seven days, then the L*a*b* value (CIELAB 1976) and the NIR reflectance were measured for the ink layer on the piece of standard offset paper as described hereabove. The drawdown samples were subsequently stored in the dark for ten weeks under standard conditions (22° C., 30% rH), in a normal atmosphere. Measurements of the L*a*b values (CIELAB 1976) and NIR reflectances were carried out so as to obtain said data for each drawdown sample after ageing. The "after ageing" data were compared to the "before ageing" data, and the change due to natural ageing was expressed as $\Delta E^*$ (CIELAB 1976) and a NIR reflectance difference $\Delta R$.

Accelerated Ageing

The drawdown samples were allowed to dry in the dark for seven days, then the L*a*b value (CIELAB 1976) and the NIR reflectance were measured. The drawdown samples were then stored in the dark for seven days in a desiccator over a saturated sodium sulfide solution (28.7 wt-% $Na_2S$, Fluka 71975, Sigma Aldrich) at room temperature (22° C., 50-60% RH). Measurements of the L*a*b* values and NIR reflectances were carried out so as to obtain said data for each drawdown sample after accelerated ageing. The "after ageing" data were compared to the "before ageing" data, end the change due to accelerated ageing was expressed as $\Delta E^*$ (CIELAB 1976) and a NIR reflectance difference $\Delta R$.

Preparation of Intaglio Printed Samples

The intaglio magnetic oxidatively drying inks described in Tables 1a, 1b and 1c were independently applied by a printing process using an Ormag intaglio proof-press. The intaglio magnetic oxidatively drying inks were independently applied on the intaglio plate with a polymer hand-roller and any ink excess was wiped off manually with paper. Printing was carried out with a printing plate (temperature of 65° C.) on a standard cotton paper substrate used for banknote applications (Louisenthal). The intaglio plate used to print the examples was composed of a set of engravings of various depths (from about 20 µm to about 100 µm) and widths (from about 60 µm to about 500 µm), engraved with a "U"-shape, such as to simulate an intaglio printed image on a banknote.

For each example, an image sample was printed according the method described hereabove. The samples were kept 24 hours at 22° C. and 50% rH under 3 kg pressure to simulate a pie of printed substrates. A blank piece of the same substrate was subsequently applied over the image sample and the so-formed assembly was submitted to a counterpressure of 3.4 bars at 80° C. with the same ORMAG Intaglio Proof Press. The image sample and the blank piece were separated and the blank piece was checked for ink transfer in order to assess the drying performance as described hereafter.

Results of Intaglio Magnetic Oxidatively Drying Inks (Tables 1a, 1 b and 1c)

A) Stability of Visible Optical Properties: ΔE* Values (CIELAB 1976)

The visible color difference between drawdown samples of the intaglio magnetic oxidatively drying inks described in Tables 1a, 1b and 1c before and after ageing according to the methods described herein is expressed as ΔE* CIELAB (1976). The CIELAB (1976) values were measured with a spectrophotometer DC 45 from Datacolor (measurement geometry: 45/0°; spectral analyzer: proprietary dual channel holographic grating. 256-photodiode linear arrays used for both reference and sample channels; light source: total bandwidth LED illumination).

ΔE* values for each drawdown sample before and after ageing were calculated according to the following equation:

$$\Delta E^* = [(\Delta L^*)^2 + (\Delta a^*)^2 + (\Delta b^*)^2]^{1/2} = [(L^*(\text{sample after ageing}) - L^*(\text{sample before ageing}))^2 + (a^*(\text{sample after ageing}) - a^*(\text{sample before ageing}))^2 + (b^*(\text{sample after ageing}) - b^*(\text{Sample before ageing}))^2]^{1/2},$$

wherein
ΔL* is the lightness difference
Δa* is the red/green difference
Δb* is the blue/yellow difference For each sample, three individual spots were measured before and after ageing.

The ΔE* values indicated in Table 1a, 1b and 1c correspond to an average value of three measurements.

Larger ΔE* values indicate stronger deviation between the color of the sample before ageing and after ageing.

B) Stability of NIR Reflectance: ΔR at 850 nm

NIR reflectances were measured on a piece of standard offset paper as described hereabove using the DC 45 from Datacolor at 850 nm. The difference in reflectance between the drawdown samples of the intaglio magnetic oxidatively drying inks described in Tables 1a, 1b and 1c before ageing and after ageing was determined as ΔR. The 100% reflectance was measured using the internal standard of the device.

For each sample, three individual spots were measured before and after ageing. The ΔR values indicated in Table 1a, 1b and 1c correspond to an average value of three measurements.

C) Drying Performance (Relative to C0a/C0b/C0c)

The drying performance of the intaglio magnetic oxidatively drying inks described in Tables 1a, 1b and 1c was carried out on the samples printed with an Ormag intaglio proof-press as described hereabove.

For each example, a scan of the blank piece prepared according to the method described hereabove was made using an Epson 7680 Pro color scanner, in RGB mode (8-bit per color channel) at a resolution of 600 dpi, so as to yield a *.tif uncompressed file. Each scan was opened in Photoshop CS 6.

The number of pixels transferred from the image sample to the blank piece was determined using the following method: the magic wand (settings: point sample, anti-alias off, contiguous off) was set to 32% tolerance, and a location where no ink transfer occurred was selected (corresponding to almost full white). "Select" and "inverse" were then applied to yield a selection containing only the transferred pixels. Finally, the number of transferred pixels was determined using the histogram.

For each scan, the sequence was repeated three times, randomly starting at different locations (full white) of the blank piece, and an average value of transferred pixels was calculated (final precision: ±5%). The average number of transferred pixels for each of the examples E1, E2, E3, E4, C1, C2, and C3 was compared with the average number of the transferred pixels of the reference (C0a, C0b and C0c) and given as a %-difference (A %) in Tables 1a, 1b and 1c. This indicated the drying performance of each intaglio magnetic oxidatively drying ink of Tables 1a, 1b and 1c by comparison with the reference (C0a, C0b and C0c). The higher the %-difference compared to the reference, the worse the ink drying performance.

D) Drying Performance (Relative to C0c Dry Sample)

The average number of transferred pixels as measured hereabove was compared to the number of pixels of a fully dried sample (drying conditions: one week at room temperature). This sample was printed using the same ink as C0c (Table 1c), using the printing method described hereabove, and scanned using the method described hereabove. The average number of transferred pixels for each of the examples C0a, C0b. C0c, E1, E2, E3, E4, C1, C2, and C3 was compared with the number of pixels of the fully dried sample using the following formula:

$$\frac{\text{Pixels in dry sample} - \text{transferred pixels}}{\text{Pixels in dry sample}} * 100$$

This indicated the absolute drying performance of each intaglio magnetic oxidative drying ink of Tables 1a, 1b and 1c. The higher the %-value compared to the fully dried sample, the better the ink drying performance. The performance was considered as "excellent" when the %-value exceeded 95%, it was considered as "good" when the %-value was comprised between 90% and 95%, and it was considered as "sufficient" when the %-value was comprised between 85% and 90%. All values below 85% were considered "insufficient."

TABLE 1a

| | ingredients | E1a wt-% | E2 wt-% | C0a wt-% | C1 wt-% |
|---|---|---|---|---|---|
| Ink formulation | Phenolic resin (varnish) | 14.9 | 14.9 | 14.9 | 14.9 |
| | Alkyd resin (binder) | 41.8 | 41.8 | 41.8 | 41.8 |
| | CaCO$_3$ (filler) | 18.4 | 18.4 | 20.4 | 18.4 |
| | Core-shell pigment particles | 12 | 12 | 12 | 12 |
| | Pigment Yellow 174 | 5 | 5 | 5 | 5 |
| | Carnauba wax | 4.7 | 4.7 | 4.7 | 4.7 |
| | Co-octoate (metal content 12 wt-%) (drier) | 0.2 | 0.2 | 0.2 | 0.2 |
| | Mn-octoate (metal content 8 wt-%) (drier) | 1 | 1 | 1 | 1 |
| | Stabilizer (see structure in Table 2) | 2 (I1) | 2 (I2) | 0 | 2 (I3) |

TABLE 1a-continued

| | ingredients | E1a wt-% | E2 wt-% | C0a wt-% | C1 wt-% |
|---|---|---|---|---|---|
| results | Viscosity [Pas] | 4.3 | 4.2 | 4.3 | 3.5 |
| | Stability[a] of visible optical properties, ΔE* | 4 | 5 | 16 | 10 |
| | Stability[a] of NIR reflectance, ΔR at 850 nm | 5 | 6 | 10 | 6 |
| | Stability[b] of visible optical properties, ΔE* | 4 | 4 | 44 | 13 |
| | Stability[b] of NIR reflectance, ΔR @ 850 nm | 0 | −8 | 13 | 9 |
| | Drying performance, transferred pixels | 81142 | 19346 | 51822 | 37485 |
| | Δ% of reference (C0a) | +57% | −63% | 0% | −28% |
| | Absolute drying performance % | 85% sufficient | 94% good | 90% good | 93% good |

[a] normal ageing,
[b] accelerated ageing

As can be seen in Table 1a, the intaglio magnetic oxidative inks comprising the one or more benzotriazole compounds of formula (I) as stabilizers (E1a, E2) exhibited an improved stability of the visual optical properties (ΔE*) not only after ten weeks of normal ageing but also after one week of accelerated ageing in a $Na_2S$ atmosphere, in comparison with the intaglio magnetic oxidative ink lacking said compounds (C0a). The comparative intaglio magnetic oxidative ink comprising a stabilizer different from formula (I) (C1) did not exhibit a strongly improved stability in comparison with the ink lacking a stabilizer (C0a).

E1a and E2 consist of intaglio magnetic oxidative inks exhibiting sufficient to good drying performance while having improved optical properties in the visible and the NIR.

TABLE 1B

| | ingredients | E1b wt-% | E3 wt-% | C0b wt-% | C2 wt-% |
|---|---|---|---|---|---|
| Ink formulation | Phenolic resin (varnish) | 14.9 | 14.9 | 14.9 | 14.9 |
| | Alkyd resin (binder) | 29.3 | 29.3 | 29.3 | 29.3 |
| | High-molecular weight alkyd resin (binder) | 12.5 | 12.5 | 12.5 | 12.5 |
| | $CaCO_3$ (filler) | 18.4 | 18.4 | 20.4 | 18.4 |
| | Core-shell pigment particles | 12 | 12 | 12 | 12 |
| | Pigment Yellow 174 | 5 | 5 | 5 | 5 |
| | Carnauba wax | 4.7 | 4.7 | 4.7 | 4.7 |
| | Co-octoate (metal content 12 wt-%) (drier) | 0.2 | 0.2 | 0.2 | 0.2 |
| | Mn-octoate (metal content 8 wt-%) (drier) | 1 | 1 | 1 | 1 |
| | Stabilizer (see structure in Table 2) | 2 (I1) | 2 (I4) | 0 | 2 (I5) |
| results | Viscosity [Pas] | 9.9 | 9.3 | 9.6 | 8.0 |
| | Stability[a] of visible optical properties, ΔE* | 3 | 4 | 14 | 23 |
| | Stability[a] of NIR reflectance, ΔR at 850 nm | −3 | 2 | 13 | 17 |
| | Stability[b] of visible optical properties, ΔE* | 1 | 1 | 30 | 24 |
| | Stability[b] of NIR reflectance, ΔR @ 850 nm | −2 | 2 | 5 | 6 |
| | Drying performance, transferred pixels | 31128 | 16642 | 19541 | 138524 |
| | Δ% of reference (C0b) | +59% | −15% | 0% | +609% |
| | Absolute drying performance % | 94% good | 97% excellent | 96% excellent | 74% insufficient |

[a] normal ageing,
[b] accelerated ageing

As can be seen in Table 1b, the intaglio magnetic oxidative inks comprising the more benzotriazole compounds of formula (I) as stabilizers (E1b, E3) exhibited an improved stability of the visual optical properties (ΔE*) not only after ten weeks of normal ageing but also after one week of accelerated ageing in a $Na_2S$ atmosphere, in comparison with the intaglio magnetic oxidative ink lacking said compounds (C0b). The comparative intaglio magnetic oxidative ink comprising a stabilizer different from formula (I) (C2) did not exhibit any improved stability in comparison with the ink lacking a stabilizer (C0b).

E1b and E3 consist of intaglio magnetic oxidative inks exhibiting good to excellent drying performance while having improved optical properties in the visible and the NIR.

TABLE 1c

| | ingredients | E1c wt-% | C0c wt-% | C3 wt-% | C4 wt-% |
|---|---|---|---|---|---|
| Ink formulation | Phenolic resin (varnish) | 13.1 | 13.1 | 13.1 | 13.1 |
| | Alkyd resin (binder) | 26.9 | 26.9 | 26.9 | 26.9 |
| | High-molecular weight alkyd resin (binder) | 16.7 | 16.7 | 16.7 | 16.7 |
| | $CaCO_3$ (filler) | 18.4 | 20.4 | 18.4 | 18.4 |
| | Core-shell pigment particles | 12 | 12 | 12 | 12 |
| | Pigment Yellow 174 | 5 | 5 | 5 | 5 |
| | Carnauba wax | 4.7 | 4.7 | 4.7 | 4.7 |
| | Co-octoate (metal content 12 wt-%) (drier) | 0.2 | 0.2 | 0.2 | 0.2 |
| | Mn-octoate (metal content 8 wt-%) (drier) | 1 | 1 | 1 | 1 |
| | Stabilizer (see structure in Table 2) | 2 (I1) | 0 | 2 (I6) | 2 (I7) |
| results | Viscosity [Pas] | 10.2 | 9.6 | 8.9 | 10.6 |
| | Stability[a] of visible optical properties, ΔE* | 7 | 20 | 16 | 10 |
| | Stability[a] of NIR reflectance, ΔR at 850 nm | 9 | 16 | 20 | 16 |
| | Stability[b] of visible optical properties, ΔE* | 7 | 24 | 12 | 10 |
| | Stability[b] of NIR reflectance, ΔR @ 850 nm | 8 | 25 | 14 | 17 |
| | Drying performance, transferred pixels | 53171 | 53720 | 64471 | 143402 |
| | Δ% of reference (C0c) | −1% | 0% | +21% | +170% |
| | Absolute drying performance % | 90% good | 90% good | 88% sufficient | 78% insufficient |

[a] normal ageing,
[b] accelerated ageing

As can be seen in Table 1c, the intaglio magnetic oxidative ink comprising the more benzotriazole compounds of formula (I) as (E1c) exhibited an improved stability of the visual optical properties (ΔE*) not only after ten weeks of normal ageing but also after one week of accelerated ageing in a $Na_2S$ atmosphere, in comparison with the intaglio magnetic oxidative ink lacking said compounds (C0c). The comparative intaglio magnetic oxidative inks comprising a stabilizer different from formula (I) (C3 and C4) did not exhibit a strongly improved stability in comparison with the ink lacking a stabilizer (C0c).

E1c consists of an intaglio magnetic oxidative ink exhibiting good drying performance while having improved optical properties in the visible and the NIR.

TABLE 2

| Stabilizer | Structure | CAS | Commercial name | Supplier |
|---|---|---|---|---|
| I1 | 5-methyl-1H-benzotriazole structure | 29385-43-1 | Wintrol ® TPF | Wincom |
| I2 | 5-(trifluoromethyl)-1H-benzotriazole structure | 1548-67-0 | 5-(trifluoromethyl)-1H-1,2,3-benzotriazole | ABCR |
| I3 | 1-methyl-1,2,3-benzotriazole structure | 13351-73-0 | 1-methyl-1,2,3-benzotriazole | ABCR |

TABLE 2-continued

| Stabilizer | Structure | CAS | Commercial name | Supplier |
|---|---|---|---|---|
| I4 | | 95-14-7 | Preventol ® BZT | Lanxess |
| I5 | | 2440-22-4 | Tinuvin ® P | BASF |
| I6 | | 25-75% 80584-90-3 and 25-75% 80595-74-0 | Cobratec ® 122 | Raschig |
| I7 | | 46% 80584-88-9, 30% 80584-89-0, and 20% water | Cobratec ® 178 | Raschig |

The invention claimed is:

1. A magnetic oxidative drying ink for intaglio printing on a substrate, said magnetic oxidative drying ink having a viscosity in the range of about 3 to about 60 Pa s at 40° C. and 1000 s$^{-1}$ and comprising a) at least one oxidative drying varnish, b) a plurality of core-shell pigment particles comprising a magnetic core and an external layer made of silver and c) one or more stabilizers selected from benzotriazole compounds having the formula (I)

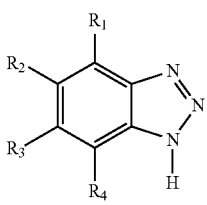

wherein
$R_1$-$R_4$ may be the same or may be different and are independently selected from the group consisting of hydrogen, linear $C_1$-$C_4$ alkyls, branched $C_3$-$C_4$ alkyls, $C_1$-$C_4$ linear haloalkyls, and branched $C_3$-$C_4$ haloalkyls.

2. The magnetic oxidative drying ink according to claim 1, wherein $R_1$-$R_4$ are may be the same or may be different and are independently selected from the group consisting of hydrogen, linear $C_1$-$C_2$ alkyls, and $C_1$-$C_2$ linear haloalkyls.

3. The magnetic oxidative drying ink according to claim 1, wherein the core-shell pigment particles comprise
a magnetic core surrounded by a first layer made of one or more inorganic materials and the external layer made of silver; or
a magnetic core surrounded by a first layer made of one or more organic materials and the external layer made of silver.

4. The magnetic oxidative drying ink according to claim 1, wherein the magnetic core is made of one or more materials selected from the group consisting of iron, $Fe_2O_3$ and $Fe_3O_4$ and mixtures or combinations thereof, and/or the one or more inorganic materials are selected from the group consisting of metals selected from the group consisting of silver, aluminum, nickel, palladium, platinum, copper, gold, rhodium, zinc, iridium and their alloys; metal oxides and metal sulfides and/or the one or more organic materials are selected from the group consisting of polyacrylates, polystyrenes, parylenes, alkoxysilanes and mixtures thereof.

5. The magnetic oxidative drying ink according to claim 1, wherein the core-shell pigment particles are present in an amount from about 3 to about 70 wt-%, the weight percents being based on the total weight of the magnetic oxidative drying ink.

6. The magnetic oxidative drying ink according to claim 1, wherein the one or more benzotriazole compounds are present in an amount from about 0.1 to about 20 wt-%, the weight percents being based on the total weight of the magnetic oxidative drying ink.

7. The magnetic oxidative drying ink according to claim 1, further comprising one or more waxes.

8. The magnetic oxidative drying ink according to claim 7, wherein the one or more waxes are present in an amount from about 0.1 to about 15 wt-%, the weight percents being based on the total weight of the magnetic oxidative drying ink.

9. The magnetic oxidative drying ink according to claim 1, further comprising one or more driers.

10. The magnetic oxidative drying ink according to claim 9, wherein the one or more driers are present in an amount from about 0.01 to about 10 wt-%, the weight percents being based on the total weight of the magnetic oxidative drying ink.

11. A process for producing the magnetic oxidative drying ink recited in claim 1, comprising a step of dispersing, mixing and/or milling the at least one oxidative drying varnish with the plurality of core-shell pigment particles comprising a magnetic core and an external layer made of silver and the one or more stabilizers selected from benzotriazole compounds having the formula (I).

12. A security feature comprising a layer or coating made of the magnetic oxidative drying ink recited in claim 1.

13. A security document comprising a substrate and one or more security features recited in claim 12.

14. A process for producing a security document, comprising a step a) of applying by an intaglio printing process the magnetic oxidative drying ink recited in claim 1 onto a substrate.

15. The process according to claim 14, further comprising a step b) of drying the magnetic oxidative drying ink in the presence of air so as to form a layer or coating on the substrate, said step of drying being performed after the step a).

* * * * *